United States Patent [19]

Laquerbe et al.

[11] 4,316,826

[45] Feb. 23, 1982

[54] CLAY AND CEMENT MORTARS, METHODS OF PREPARING THEM

[76] Inventors: Michel Laquerbe, 20, Avenue des Buttes de Coesmes, Beaulieu-35.000 Rennes; François Tatard, 119, rue de Fougéres, 35,000 Rennes, both of France

[21] Appl. No.: 58,922

[22] Filed: Jul. 19, 1979

Related U.S. Application Data

[63] Continuation-in-part of Ser. No. 813,965, Jul. 8, 1977, abandoned.

[30] Foreign Application Priority Data

Jul. 21, 1978 [FR] France .................................. 78 21747

[51] Int. Cl.$^3$ .......................... C04B 7/00; C04B 7/02; C04B 7/356; C04B 31/00
[52] U.S. Cl. .................................... 260/15; 260/17.3; 260/29.4 R; 106/76; 106/90; 106/93; 106/96; 106/97
[58] Field of Search ............. 260/15, 29.4 UA, 29.4 R, 260/17.3; 106/90, 93, 96, 97, 76

[56] References Cited

U.S. PATENT DOCUMENTS 4,128,258  8/1980  Rothberg ........................ 260/17 R
4,172,056  10/1980  Marra ............................ 260/17.2

FOREIGN PATENT DOCUMENTS 998159  7/1965  United Kingdom ................ 264/122

OTHER PUBLICATIONS

Belgian, 856767, Abstract (Jan. 13, 1978), Soc. Metallurg Breta, "Clay Cement Mortar-Resins-Products. Chem. Absts., vol.: 67830m, Bleeding-Cement-Clays, Bruere.

*Primary Examiner*—John Kight, III
*Assistant Examiner*—N. M. Nutter

[57] ABSTRACT

The invention relates to mortars made of clay, cement, water and an urea-formaldehyde or melamine-formaldehyde resin.

Paraffin is added to the powdered cement and, just before shaping the mortar, there is added to said mortar sodium aluminate and sodium silicate.

2 Claims, No Drawings

CLAY AND CEMENT MORTARS, METHODS OF PREPARING THEM

The present application is a continuation-in-part of Ser. No. 813,965 filed Jul. 8, 1977, now abandoned.

The invention relates to improvements in mortars of clay, cement, gauging water and an additive, the proportion by weight of clay being greater than that of the cement, as well as to methods for the preparation of these mortars and to the products obtained by means of said mortars, the improvements concerned being additional to those which have already been contributed to the art in the aforementioned related application and which consisted essentially of selecting the additive from among urea-formaldehyde and melamine-formaldehyde resins and their derivatives, generally in aqueous solution, the percentage by weight of said additive, calculated by weight of dry extract of this additive with respect to the weight of dry extract of the clay-cement mixture, being comprised between 1 and 20%.

It is a particular object of the present improvements, to improve the plasticity of the mortars concerned and to delay the setting thereof, which facilitates their application and in particular permits their injection into molds of small aperture such as sheaths for pre-stressing.

They comprise, principally, the following features which are used preferably in combination:

paraffin is added to one of the constituents of the mortar, preferably to the powdered cement, the weight of this paraffin being, in the mortar, comprised between 0.3 and 5% of the weight of the cement, the paraffin added is a paraffin solid at ordinary temperature, melted and dissolved in an organic solvent composed preferably half of a hydrocarbon and half of acetone, the amount by weight of the paraffin being of the order of ⅔ of this solution, the paraffin solution according to the preceding paragraph is mixed directly with the powdered cement, the paraffin solution according to the last paragraph is mixed with water, in a substantially equivalent amount, with the amino-resin constituting the additive, and preferably also with a cellulosic compound, the creamy liquid obtained constituting the liquid component whose addition to the powdery clay-cement mixture enables the mortar to be constituted, there is added to the above-defined mortar, simultaneously but separately, sodium aluminate and sodium silicate in substantially identical proportions by weight, the amount by weight of these salts thus added to the mortar being comprised between 0.4 and 2% by weight of the dry components of the starting clay-cement powder.

The invention comprises, apart from these main features, certain other features which are preferably used at the same time and which will be more explicitly considered below.

In the following, some preferred embodiments of the invention will be described, of course in non-limiting manner.

The mortar is composed of cement, of clay in a preponderant proportion by weight, of gauging water and of an amino resin.

Said amino resin is generally chosen among urea-formaldehyde and melamine-formaldehyde resins and other derivatives of ammonia such as amides, for instance formamide. It has been proposed to add to the clay a water-repellant agent and some examples have been given for such an agent, such as a quaternary ammonium salt.

Said agents generally reduce the gauging water but they accelerate the setting of cement if the grains of said cement are not isolated from said agents and from water.

Applicant has discovered that, to obtain such a temporary isolation, an addition of paraffin was quite satisfactory and that its presence revealed itself as being particularly advantageous if it were added to the cement in powder itself.

This addition of paraffin permits the fluidity or plasticity of the paste to be substantially improved and the setting thereof to be delayed, which facilitates its application in numerous cases.

The paraffin concerned—generally considered as a mixture of alkanes $C_nH_{2n+2}$—is preferably selected from among those which are solid at ordinary temperature, i.e. for which n is comprised between 17 and 60, the melting temperature of the corresponding substances raising from 22° C. for $n=17$ until 99° C. for $n=60$.

It is heated so as to melt it, that is to say to a temperature generally comprised between 50° and 100° C., and there is added thereto an organic solvent composed notably half by a hydrocarbon (such as gasoline, petroleum or white spirit) and half by acetone, the amount by weight of this solvent corresponding to a third of the total.

The solution obtained then preserves its liquid state on returning to ambient temperature.

In a first embodiment, powdered cement is added directly to this solution and the mixture is stirred at high speed to render it homogeneous.

The amount by weight of the paraffin thus added to the cement is comprised between 0.3 and 5% of that of the cement (counted for 100%), preferably between 0.5 and 3% for a commercial Portland cement having a specific surface of 3,400 cm²/g: if the percentage of said addition is lower than 0.3, its water-repelling action cannot be ascertained; if said percentage is higher than 5, the water-repelling effect becomes irreversible and makes impossible the final setting of the cement.

It is the powdered mixture thus obtained which then constitutes the starting "cement component" in the method of manufacturing the mortar.

In a second embodiment, an equivalent amount of water and amino-resin is added directly to the above paraffin solution, the amount of the amino-resin being determined so as to respond to the above-defined criteria, this amount being hence generally several times greater than that of the solution.

The "sauce" thus obtained can then be preserved as it is for later use to manufacture a mortar.

This is in fact what constitutes the essential of the liquid component of the mortar according to the invention. It suffices to add it to the minerals (clay and cement) and to the gauging water to constitute this mortar.

If it is desired to preserve the "sauce" concerned for a long period, that is to say, to avoid the formation of deposite in the latter, it is advantageous to incorporate therein, in a minor proportion, for instance comprised between 0.1 and 0.3% of the weight of said "sauce", a cellulosic compound selected notably from among the following: methylcellulose, hydroxyethyl cellulose, carboxymethylcellulose, which confers on it a creamy consistency.

In a third embodiment, it is not the cement, but the clay or the clay-cement mixture, to which is added the paraffin solution with a proportion by weight preferably greater than 2% of the weight of the dry clay.

In all cases the paraffin mixed to cement is temporarily adsorbed by the grains of said cement, which are thus isolated from water.

The subsequent "desorption" may be obtained by a lot of ways, but it is preferably produced by the excess of soda supplied in the last stage of the process by the addition of sodium silicate and sodium aluminate to the paste (see thereafter).

In the slightly porous products finally obtained from mortars thus impregnated with paraffins, the latter remains fixed on the walls of the pores or capillaries of said products and thus resists any entry of water subsequently into the latter.

This advantage is of particular value for the constitution of tiles or other products for weather protection as well as for products of the "expanded" type.

It has been proposed also, in order to accentuate as desired the basic character of the clay, to add to the latter a sodium aluminate or a sodium silicate.

Applicant has discovered that it was particularly advantageous to use these two salts simultaneously, in particular within the scope of the above paraffin addition.

In fact, these two salts enable the plasticity of the clay-cement mixture to which they are simultaneously added, to be improved, by changing the rheological state of this mixture to the point of rendering it almost thixotropic due to the fact of the chemical reactions that they cause together, which reactions are manifested by precipitation of silica and of gelatinous alumina as well as aluminum silicate, which material shows grains as scales or spindles.

These reactions having a limited duration, it is advantageous to cause them in the course of the manufacture itself of the products by means of the mortar, just before the final shaping of the latter.

As stated above, it is especially advantageous to provide this addition of alkali plasticizers within the scope of the above-mentioned paraffin addition, in view of the fact that the first addition permits:

on the one hand, in a first stage, to delay the setting of the cement by the presence of the water-repellant paraffin, and on the other hand, in a second stage, to ensure said setting efficiently as soon as the soda derived from the second addition has been able to destroy the water-repellant film on the scale of each cement crystal and not on the scale of the pores and capillaries created in the setting mass by evaporation of the exceeding liquids (water, solvents, ...).

It may even be noted that, in certain cases, the absence of this attack by this soda, which attack renders the ultimate setting to be ensured, could be considered as a drawback.

The amount added to the mortar of the sodium aluminate (which is generally present in the form of a solution in the soda) and of the sodium silicate are respectively of comparable importance and the weight of each of them corresponds preferably to a percentage comprised between 0.2 and 1% of the weight of dry extracts of the clay-cement mixture.

As it self-evident and as emerges also and already from the foregoing, the invention is in no way limited to those of its types of application and embodiments which have been more especially considered; it encompasses, on the contrary, all modifications.

I claim:

1. Method of preparation of a clay-cement mortar comprising a mixture of clay, cement and an additive selected from the group consisting of urea-formaldehyde resins, melamine-formaldehyde resins and formamide, the proportion by weight of the clay being greater than that of the cement and the percentage by weight of the additive, calculated as weight of dry extract of this additive with respect to the dry extract weight of the clay-cement mixture, being between 1 and 20%, together with a weight of paraffin solid at ordinary temperature comprised between 0.3 and 5% of the weight of the cement, characterized in that said paraffin is melted and dissolved in an organic solvent composed substantially of equal parts of a hydrocarbon and acetone, the resulting paraffin solution being mixed with a substantially equivalent amount of water and with said clay, cement, additive and a cellulosic compound.

2. Liquid component for the clay-cement mortar prepared in accordance with claim 1, characterized in that it comprises paraffin in solution in an organic solvent, water, an additive selected from the group consisting of urea-formaldehyde resins, melamine, formaldehyde resins and formamide, and a cellulosic compound.

* * * * *